(12) United States Patent
Baurand et al.

(10) Patent No.: US 7,479,858 B1
(45) Date of Patent: Jan. 20, 2009

(54) REVERSE CURRENT RELAY

(75) Inventors: Gilles Baurand, Montesson la Borde (FR); Dominique Leglaye, Rueil-Malmaison (FR); Jean-Pierre Tellier, Saint-ouen-l'Aumone (FR)

(73) Assignee: Schneider Electric Industries SA, Rueil-Malmaison (FR)

( * ) Notice: Subject to any disclaimer, the term of this patent is extended or adjusted under 35 U.S.C. 154(b) by 1465 days.

(21) Appl. No.: 10/110,321

(22) PCT Filed: Oct. 10, 2000

(86) PCT No.: PCT/FR00/02808

§ 371 (c)(1),
(2), (4) Date: Apr. 24, 2002

(87) PCT Pub. No.: WO01/27958

PCT Pub. Date: Apr. 19, 2001

(30) Foreign Application Priority Data

Oct. 11, 1999 (FR) .................................. 99 12746

(51) Int. Cl.
*H01H 63/02* (2006.01)
(52) U.S. Cl. ......................................... 335/132; 335/6

(58) Field of Classification Search .................... 335/6, 335/8, 9, 10, 132
See application file for complete search history.

(56) References Cited

U.S. PATENT DOCUMENTS

| 6,426,634 B1 * | 7/2002 | Clunn et al. ................. 324/536 |
| 6,452,468 B1 * | 9/2002 | Jacq et al. .................... 335/132 |
| 2003/0202305 A1 * | 10/2003 | Engel et al. ................. 361/93.8 |

* cited by examiner

*Primary Examiner*—Elvin G Enad
*Assistant Examiner*—Bernard Rojas
(74) *Attorney, Agent, or Firm*—Steptoe & Johnson LLP

(57) ABSTRACT

Contactor-circuit breaker comprising a control electromagnet and a protection device both capable of acting on mobile contacts in response respectively to a deliberate control and to a detected electrical fault, through a multi-pole device. An electromagnetic tripping device (41) is added onto a contact control mechanism (40). The protection device (30), preferably interchangeable, is connected to the electromagnet (20) through a control line (33B) and to the control mechanism (40) through a trip line (33A) so that it outputs an electrical power supply to the electromagnet on the control line, and in the case of a fault, a trip signal on the trip line. The electromagnet (20) is of the DC type, and the protection device (30) adapts its power supply voltage.

12 Claims, 2 Drawing Sheets

REVERSE CURRENT RELAY

BACKGROUND OF THE INVENTION

This invention relates to a contactor-circuit breaker comprising poles with separable contacts, a control electromagnet to control these contacts, and a protection device associated with a tripping device.

A contactor-circuit breaker is an electrical device used to deliberately control the power supply and to break lines carrying a load such as a motor (in other words to switch this load on and off) using an electromagnet which is specific to its "contactor" part, and to automatically break the load circuit using the protection device which is specific to its "circuit breaker" part, as soon as the protection device detects an electrical fault such as a short circuit on at least one of the lines.

In this type of equipment, the electromagnet and the protection device each use a multi-pole device to act on the mobile contacts in response to a deliberate control and detection of an electrical fault, respectively. The tripping device is capable of changing from a contact closed state to a contact open state under the action of an electromagnetic tripping device, and it may be reset by a manual control device itself capable of opening and closing the contacts.

Document EP-366 519 thus describes a contactor-circuit breaker of the type mentioned above. The protection device is mainly mechanical, such that a large number of switches are necessary to cover the required range of power voltages and currents.

Document FR-2 759 489 describes a contactor-circuit breaker in which the electromagnet switches contacts both in contactor mode and in circuit breaker mode. The hybrid nature of the operation of the electromagnet and its need for fast control in circuit breaker mode then cause problems.

SUMMARY OF THE INVENTION

The purpose of the invention is to reconcile reliable operation in contactor mode with high breaking speed in circuit breaker mode, while organizing mechanical connections and electrical lines for the switch in order to cover the required range of power voltages and currents with a minimum number of components.

According to the invention, an electromagnetic tripping device is added to the control mechanism, and the protection device is connected to the electromagnet through a control line and to the control mechanism through a trip line, in order to output an electrical power supply to the electromagnet on the control line and, in the case of an electrical fault, a trip signal on the trip line.

Preferably, the protection device is connected to the AC or DC power supply terminals, while the electromagnet is of the DC type operating at a predetermined voltage, and the protection device is provided with a voltage adapter circuit capable of converting the power supply voltage into a predetermined voltage to power the electromagnet. Furthermore, the protection device is preferably capable of outputting a constant current to the electromagnet in its energize and hold phases.

The power conductors, the separable contacts and associated extinguishing chambers can advantageously be housed in a base, the protection device being a removable module added interchangeably to the base, whereas the electromagnet and the control mechanism are fixed to the base. In this case, the electromagnet and the control mechanism may be housed in a part of the base projecting forwards such that the components in the base, starting from the top and working downwards, are the electromagnet and the control mechanism, the protection device and a compartment in which auxiliary contacts add-on can be housed. The power supply terminals for the electromagnet coil can then be housed adjacent to the protection module and at the side of the compartment in which auxiliary contacts can be added.

Advantageously, the base may also have a compartment for housing a communication add-on, between the protection module and the compartment for add-on auxiliary contacts. It is advantageous if the compartments set aside for the communication add-on and the auxiliary contacts add-on are grouped under the removable protection module.

BRIEF DESCRIPTION OF THE DRAWINGS

The following description gives one non-limitative embodiment of the invention with respect to the attached drawings.

DETAILED DESCRIPTION

Figure 1:
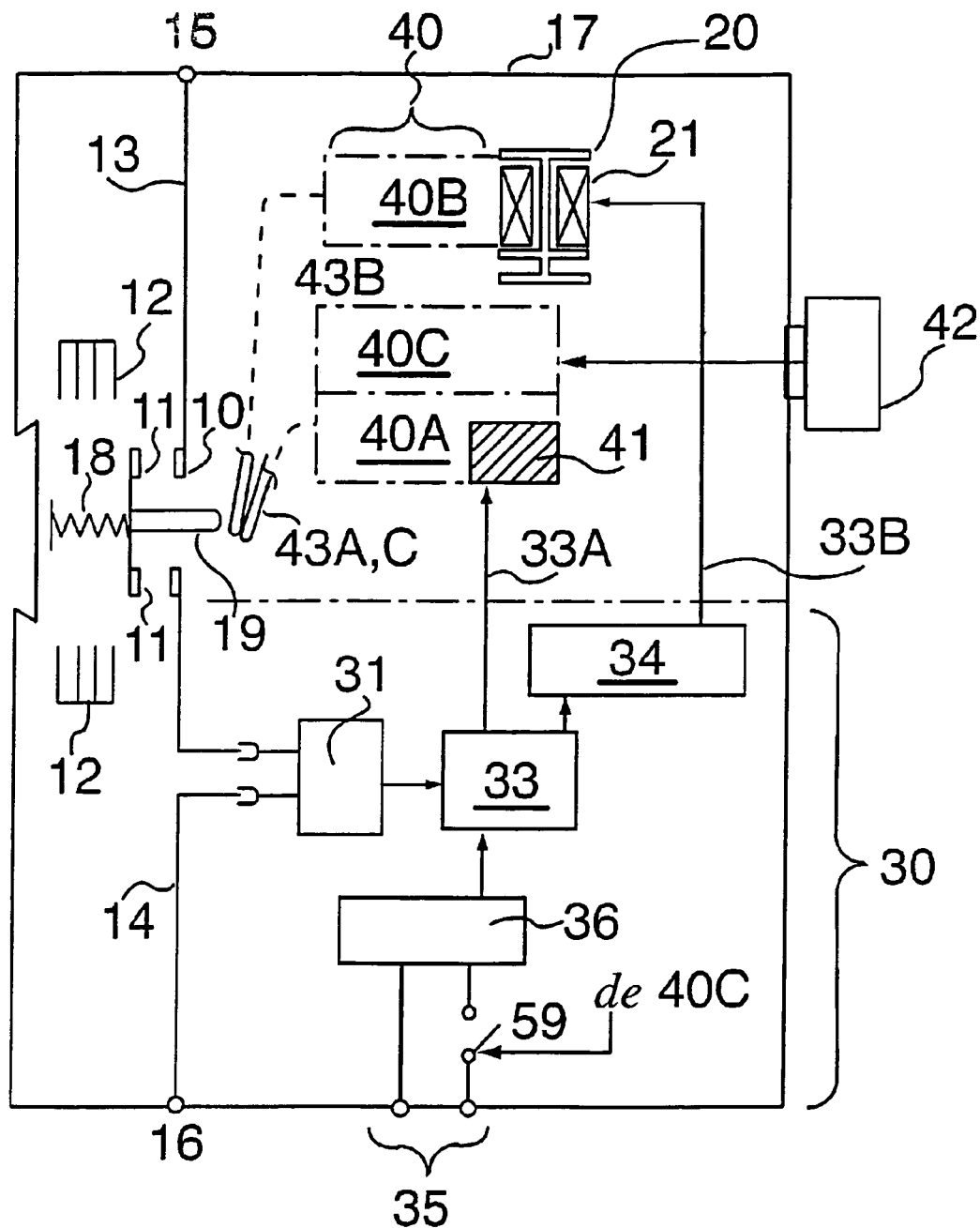
FIG. 1 is a diagram of a contactor-circuit breaker according to the invention.

The contactor-circuit breaker comprises several contactor poles fitted with fixed contacts 10 and mobile contacts 11 associated with extinguishing chambers 12. The fixed contacts 10 are connected by power conductors 13, 14 to source power terminals 15 and load power terminals 16 placed in the equipment housing 17 or on terminal blocks fitted on the housing. For each pole, the mobile contacts 12 are laid out on a bridge forced in the closing direction by a spring 18 and in the opening direction by a pusher 19.

The contactor-circuit breaker comprises a monostable or bistable type electromagnet 20 and an electronic protection and control device 30; the end purpose of the electromagnet and the protection device is to act on the pushers 19 of the various poles. Note that the electromagnet 20 is of the DC type and it is independent of the power supply voltage, for example of the network, whereas different protection and control device 30 are provided as a function of the power supply voltage; for example 24V DC, 24 V AC, 72 V AC, 240 V AC, etc. Therefore device 30 firstly adapts the power supply voltage to the DC voltage required for the electromagnet, and secondly supplies a constant current, for example of the order of 100 mA, to the coil 21 of the electromagnet 20 when it is in the energize or the hold position.

Figure 2:
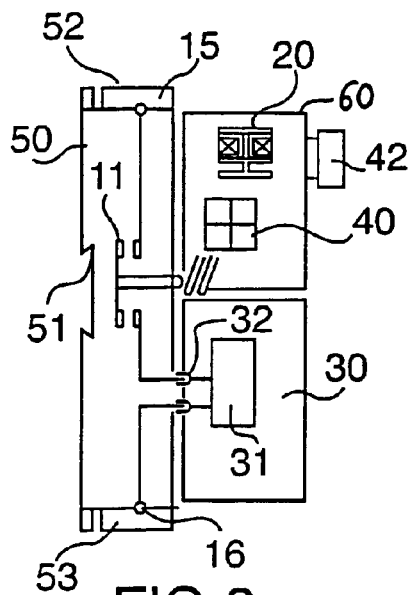
FIGS. 2 to 4 are diagrams of variants of the contactor-circuit breaker.

The protection and control device 30, hereinafter simply denoted the "protection device", comprises current sensors 31 that detect currents in the various poles; the sensors 31 may be connected to the power conductors 14 of the various poles by clips or plugs 32 as shown in FIG. 2. The sensors 31 are connected to a protection circuit 33 that generates a fault signal in the case of a short circuit detected by sensors or in the case of another electrical fault. The output from the protection circuit 33 is connected through a trip line 33A to an electromagnetic tripping device 41 with intermittent action that operates a lever of a lock belonging to a contact control mechanism 40. The protection circuit 33 also acts as a power supply line and it is connected to a control circuit 34 that determines a regulated power supply current for the coil and is connected through a control line 33B to the coil 21 of the electromagnet 20.

The power supply voltage for the protection device, the tripping device and the coil is applied to the associated terminals 35 on the protection device 30 and located on the housing itself of device 30 or on a terminal block or add-on attached to the device, or to a base on which the device is fitted, depending on the case. The protection device 30 is variable depending on the current rating of the contactor-circuit breaker and comprises a voltage conversion circuit 36 connected to the power supply terminals 35 of the contactor-circuit breaker and capable of outputting a voltage at a predetermined level to device 30 and to the electromagnet coil 21.

A manual control button 42 capable of being moved into an On position or an Off position cooperates with mechanism 40 to control switching of the contacts 11. Obviously, two buttons can be provided, one for the On function and the other for the Off function. The control mechanism 40 comprises:
- a bistable trip part 40A controlled by the electromagnetic tripping device 41,
- an automatic bistable control part 40B controlled by the electromagnet 20 from an On or Off order sent to terminals 35 and,
- a manual control part 40C controlled directly by button 42 and that can be influenced by the trip part 40A.

Parts 40A and 40C act on the mobile contacts 11 through a sliding or pivoting device 43A, C and part 40B acts on the mobile contacts 11 through a sliding or pivoting device 43B. These two devices 43A, C and 43B may be separate. In a preferred embodiment, the devices 43A, C and 43B can be applied to a common pivoting multi-pole lever 44, that itself acts on the polar pushers 19 (see FIG. 3).

Figure 3:
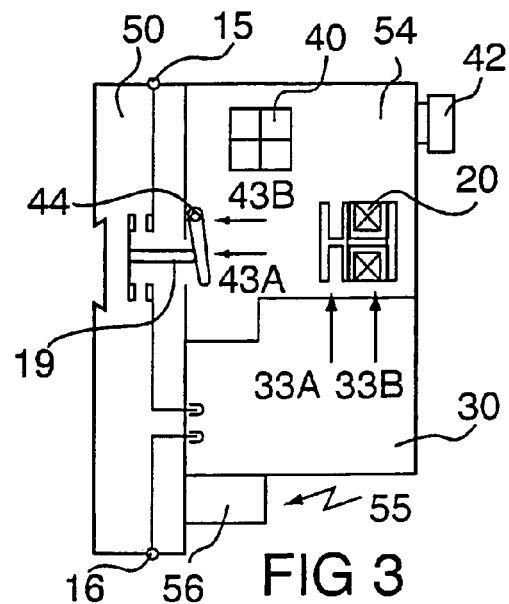
Figure 4:
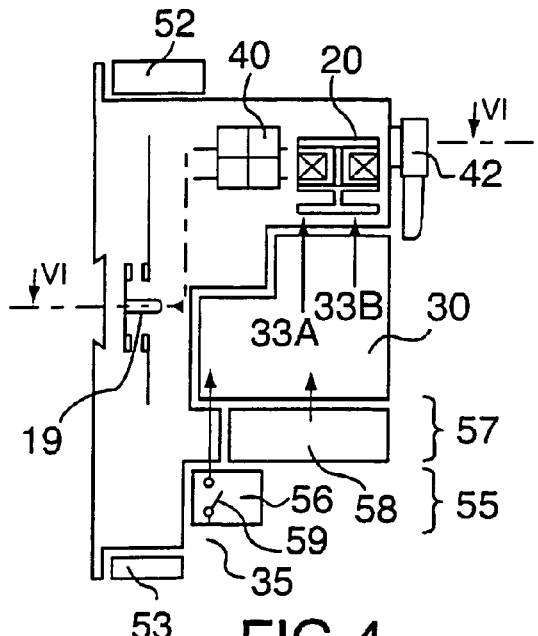
Figure 5:
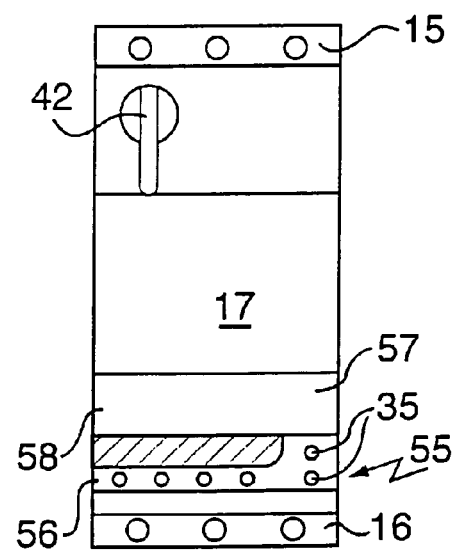
FIGS. 5 and 6 show a front view and a sectional view along plane VI-VI of the contactor-circuit breaker.
Figure 6:
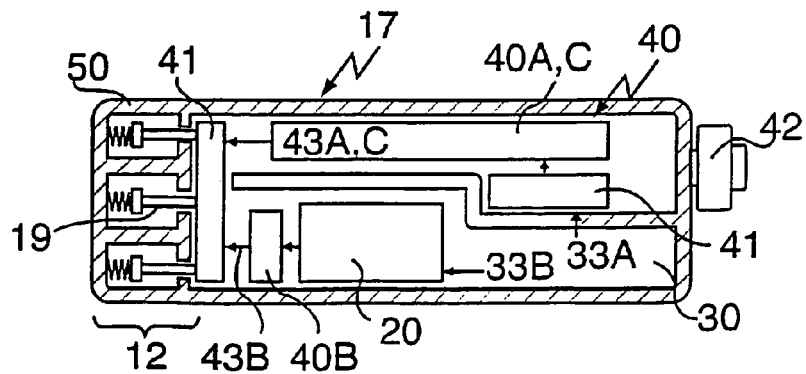

In the embodiments shown in FIGS. 2 to 4, the contactor-circuit breaker comprises a base 50 and the protection device 30 is composed of an electronic protection module added on interchangeably to the base as a function of the current rating assigned to the contactor-circuit breaker. The rear of the base is provided with means of attachment 51 to a support such as a standard rail or a carrier plate and comprises, or is fitted at its top and bottom parts, with terminal blocks 52, 53 containing power terminals 15, 16. The base contains power conductors 13, 14, fixed contacts 10 and mobile contacts 11 and extinguishing chambers 12.

On FIG. 2, the electromagnet 20 and the control mechanism 40 are housed in an electromechanical control module 60 assembled to base 50. In FIGS. 3 and 4, the electromagnet 20 and the control mechanism 40 are housed in one (or two) compartment(s) located near the top of the base 50 in a projection 54 from the base. In this case, this is an electromechanical control and breaking assembly 50, 20, 40 that is independent of the power supply voltage and that remains unchanged for different current ratings, the voltage adaptation being achieved by the electronic circuitry in the protection module 30 and the current rating being achieved by the choice of a given protection module 30.

In FIG. 3, the electromagnet 20 and the protection module 30 are placed in the projection 54 on the base such that the electromagnet 20 is installed at the top of the base, followed by the mechanism 40, the protection module 30 and a compartment 55 that will contain an auxiliary contacts add-on 56, in sequence towards the bottom of the base. The power supply terminals 35 of the coil 21 of the electromagnet 20 are placed in compartment 55 or in the auxiliary contacts add-on 56.

In FIG. 4, between the protection module 30 and the compartment 55 containing the auxiliary contacts add-on 56, the base 50 is provided with a compartment 57 that will contain a communication add-on 58, for example to which a communication bus can be added to connect the device considered with other electrical devices, this bus being capable of powering and controlling the switch. The protection module box 30 may be provided with a shoulder 37 to hold the communication add-on 58 in its compartment 57.

A switch 59 is placed in the add-on 56 (FIG. 4) or in the protection module 30 (FIG. 1) to cut off the power supply to the protection module when the button is in the Off position.

The contactor-circuit breaker is installed and operates as follows. A protection module 30 is added onto a base 50 equipped with an electromagnet with the required rating. This module is capable of adapting the voltage to the nominal operating voltage of the electromagnet and supplying a constant current to the electromagnet, both in its energize phase and in its hold phase.

Assuming that the button 42 is initially in the On position, the voltage applied to the terminals 35 will supply power to coil 21 through the control circuit 34, and close contacts 10, 11 through part 40B of the mechanism 40. The contacts are opened manually by putting button 42 in the off position through part 40C of mechanism 40, while switch 59 opens as described above. The contacts are opened automatically when circuit 33 is switched, for example as a function of the overcurrent signal output by a sensor 31; this switching will switch the part 40A of the mechanism 40 through the tripping device 41. If there is no voltage at terminals 35, the coil 21 will be disexcited and contacts will be opened through part 40B.

The invention claimed is:

1. A contactor-circuit breaker comprising:
   power conductors comprising separable fixed and mobile contacts,
   a contact control mechanism comprising at least one multi-pole device for putting said contacts in a closed or open state,
   a control electromagnet connected to said contact control mechanism for receiving a deliberate control signal on a control line and acting in response to such control signal to cause the contact control mechanism to put the contacts in closed or open state,
   a protection device comprising means for detecting currents on said power conductors and means for generating a trip signal on a trip line in response to detection of an electrical fault,
   wherein an electromagnetic tripping device is associated with the control mechanism, and
   the protection device is connected to the control electromagnet through said control line and to the control mechanism through said trip line, such that the protection device is for outputting electrical power for the control electromagnet on the control line and a trip signal to said electromagnetic tripping device on the trip line.

2. The contactor-circuit breaker according to claim 1, wherein the protection device is connected to AC or DC power supply terminals, the electromagnet is of the DC type operating at a predetermined voltage, and the protection device comprises a voltage adapter circuit capable of converting the power supply voltage into a predetermined voltage to power the electromagnet.

3. The contactor-circuit breaker according to claim 1, wherein the protection device outputs a constant current to said control electromagnet in energize and hold phases.

4. The contactor-circuit breaker according to claim 1, wherein the mobile contacts are located on contact bridges, the displacement of which is controlled by pushers, and the control electromagnet and the control mechanism act on a common lever applicable to the pushers.

5. Contactor-circuit breaker according to claim 1, characterized by the fact that the power conductors (13, 14), the separable contacts (10, 11) and the associated extinguishing chambers (12) are located in a base (50) and the protection device (30) is a removable module added interchangeably to the base, whereas the electromagnet (20) and the control mechanism (40) are fixed to the base.

6. Contactor-circuit breaker according to claim 5, characterized by the fact that the electromagnet (20) and the control mechanism (40) are housed in a part (54) of the base (50) projecting forwards such that it contains the electromagnet (20) at the top of the base followed in sequence towards the bottom by the control mechanism (40), the protection device (30) and a compartment (55) for an auxiliary contacts add-on (56).

7. Contactor-circuit breaker according to claim 5, characterized by the fact that the power supply terminals (35) of the coil (21) of the electromagnet (20) are housed adjacent to the protection module (30) in the compartment (55) for the auxiliary contacts add-on (56).

8. Contactor-circuit breaker according to claim 5, characterized by the fact that the base (50) is provided with a compartment (57) for housing a communication add-on (58), between the protection module (30) and the compartment (55) for the auxiliary contacts add-on (56).

9. The contactor-circuit breaker according to claim 1, further comprising a manual control button associated with the electromagnet, such that a user input received at the manual control button engages or disengages the electromagnet from electrical power.

10. A contactor-circuit breaker comprising:
power conductors comprising poles with separable fixed and mobile contacts to which extinguishing chambers are associated,
a control mechanism for acting on said mobile contacts,
an electromagnet for receiving a deliberate control signal and acting on said mobile contacts via said control mechanism in response to said control signal,
a protection device comprising means of detecting currents carried by said power conductors and a first electrical line associated with the electromagnet, said protection device for acting on said mobile contacts via said control mechanism in response to detection of an electrical fault,
wherein the protection device is interchangeable,
the protection device comprises electronic means for converting a power supply voltage into a voltage suitable for the electromagnet,
the protection device is connected through a second electrical line to a magnetic tripping device for controlling said control mechanism, such that when the protection device outputs a trip signal to said magnetic tripping device, the magnetic tripping device causes the control mechanism to put said contacts in an open state,
the control mechanism is capable of holding the contacts open and can be reset by a manual control button, and
the control mechanism comprises a bistable automatic control part controlled by the electromagnet and a bistable trip part controlled by the magnetic tripping device to act on the contact poles.

11. The contactor-circuit breaker according to claim 10, wherein the protection device comprises means of supplying power to a coil of the electromagnet with an approximately constant current in the various phases of the contactor-circuit breaker in an On condition.

12. The contactor-circuit breaker according to claim 9, wherein the protection device further comprises a protection circuit and a control circuit,
the protection circuit is for analyzing inputs from said means of detecting currents and said manual control button and for outputting at least one of a trip signal to said electromagnetic tripping device and a first control signal to said control circuit, and
said control circuit is for outputting a control signal associated with said first control signal to said control electromagnet.

* * * * *